United States Patent

[11] 3,622,635

| [72] | Inventors | Franco Gozzo<br>Saronno (Varese);<br>Venanzio Oprandi, Bergamo, both of Italy |
|---|---|---|
| [21] | Appl. No. | 758,134 |
| [22] | Filed | Sept. 6, 1968 |
| [45] | Patented | Nov. 23, 1971 |
| [73] | Assignee | Montecatini Edison S.p.A.<br>Milan, Italy |
| [32] | Priority | Sept. 29, 1967 |
| [33] | | Italy |
| [31] | | 21043/67 |

Continuation-in-part of application Ser. No. 642,326, May 31, 1967. This application Sept. 6, 1968, Ser. No. 758,134

[54] PROCESS FOR THE PRODUCTION OF OXYGEN-CONTAINING FLUORO COMPOUNDS
6 Claims, No Drawings

[52] U.S. Cl............................................ 260/615 A,
260/348 R, 260/348.5 R, 260/463, 260/544 F, 260/610 B
[51] Int. Cl. ............................................ C07c 43/30
[50] Field of Search............................ 260/615 A,
614 F, 615 BF, 348, 348.5, 544 F

[56] References Cited
UNITED STATES PATENTS

| 3,214,478 | 10/1965 | Milian ...................... | 260/615 BF |
| 3,242,218 | 3/1966 | Miller......................... | 260/614 F X |
| 3,342,875 | 9/1967 | Selman et al. .............. | 260/615 BF |
| 3,392,097 | 7/1968 | Gozzo et al. ................ | 260/615 A UX |
| 3,393,158 | 7/1968 | Warnell....................... | 260/615 BF X |
| 3,402,169 | 9/1968 | Jackson....................... | 260/615 BF X |
| 3,412,148 | 11/1968 | Arbogast..................... | 260/615 BF X |
| 3,423,364 | 1/1969 | Kowanko .................... | 260/615 BF |
| 3,451,908 | 6/1969 | Sianesi et al. ............... | 204/158 |

FOREIGN PATENTS

| 1,526,663 | 4/1968 | France ....................... | 260/615 A |

OTHER REFERENCES

Gozzo et al. II, Nature, Vol. 206, May 1, 1965, pp. 507–508.

Gozzo et al. III, Tetrahedron, Vol. 22, No. 6, June 1966, pp. 1765–1770.

*Primary Examiner*—Howard T. Mars
*Attorney*—Karl F. Ross

ABSTRACT: Process for producing polyoxyperfluoromethylene polymers, carbonylfluoride and $C_2F_4O$ wherein tetrafluoroethylene is reacted with molecular oxygen in the presence of ozone in a liquid reaction medium from the group of fluorinated and chlorofluorinated organic compounds at a temperature between substantially 10° and 40° C. and at an absolute pressure between substantially 700 and 800 mm./Hg.; the molar ratio $C_2F_4 : O_2$ ranges between substantially 1 and 2.5 (preferably 1.5 to 2) and the molar ratio $C_2F_4 : O_3$ ranges between substantially 10 and 500 (preferably 100 to 400).

PROCESS FOR THE PRODUCTION OF OXYGEN-CONTAINING FLUORO COMPOUNDS

This application is a continuation-in-part of our application Ser. No. 642,326 filed 31 May 1967 and entitled "PROCESS FOR THE PRODUCTION OF OXYGEN-CONTAINING FLUORO COMPOUNDS."

The present invention relates to a process for the preparation of organic fluorine-containing compound which also contain oxygen bonded to the carbon and, more particularly, to a process for the production of compounds by oxidation of tetrafluoroethylene and represents an improvement of the process described and claimed in the aforementioned copending application.

In application Ser. No. 642,326, we have described a process for the preparation of organic oxygen-containing fluorocarbons in which tetrafluoroethylene is reacted with molecular oxygen containing ozone in a gaseous state, the reaction being carried out at about atmospheric pressure and room temperature to yield a liquid polymer with a polyoxyperfluoromethylene structure. The liquid polymer is obtained together with tetrafluoroethylene oxide and COF2. More specifically, the process involves reacting tetrafluoroethylene ($C_2F_4$) with zone-containing oxygen which is carried out within a limited pressure range of substantially 700 to 800 mm. (Hg.) and in the narrow temperature range of substantially 0° to 40° C. with a $C_2F_4$: $O_2$ molar ratio between 0.05 and 5, and a $C_2F_4$:$O_3$ molar ratio of 2 to 200. As noted in that application, it has been found, surprisingly, that it is possible in the presence of externally produced ozone to carry out this reaction by intimately mixing an ozonized oxygen stream and a tetrafluoroethylene stream at the indicated absolute pressure and the given temperature while substantially continuously recovering from the reaction zone a gaseous mixture containing substantial quantities of oxyfluoro compounds such as $COF_2$ and $C_2F_4O$, and recovering as a liquid phase, the polyoxyperfluoromethylene. The reaction affords greater control and is substantially less expensive than catalytic reactions or photochemically induced reactions, while producing polymeric material of great homogeneity, reproducibility and desirable physical properties.

As noted, excellent results are obtained when ambient pressures and temperatures (room pressure and temperature) are employed, the ozonized oxygen stream being produced by passing oxygen through an ozonizing apparatus (e.g., of the electrical discharge type).

Preferably, the streams are introduced through coaxial pipes in intimate mixture and accumulate in the reactor under continuous and efficient stirring. During this reaction, a liquid product with polyoxyperfluoromethylene chain structure gathers at the bottom of the reactor while a mixture of gaseous products constituted largely by tetrafluoroethylene oxide ($C_2F_4O$) and carbonylfluoride ($COF_2$ and is condensed by cooling to temperature between −110° and −120° C. Thus a practically complete condensation of the tetrafluoroethylene oxide along with minor quantities of residual of tetrafluoroethylene and carbonylfluoride is obtained. The uncondensed gases, constituted largely by tetrafluoroethylene, unreacted oxygen ($O_2$) and carbonylfluoride are bubbled through an alkali-filled absorption tower for complete absorption of the carbonylfluoride from the uncondensed gases. The mixture of tetrafluoroethylene and oxygen, thus purified, is recycled. The condensate, which constitutes an enriched mixture of tetrafluoroethylene oxide is subjected to fractional distillation to yield a pure epoxide-type compound of the structural formula:

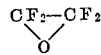

The polymeric product is, as noted, in the liquid state and is of polyoxyperfluoromethylenic structure with an erage molecular weight of 1,400 to 1,500. As noted in the aforementioned application and the commonly owned U.S. Pat. No. 3,392,097, the polymer has, as its principal molecular group, $+CF_2O+_n$ where $n$ is a number representing the degree of polymerization and a repetition number of structural units in the polymeric chain. Generally $n$ exceeds 15. The units are apparently connected in a head-to-tail chain such that the polymer is obtained as oil or semisolid depending, of course, on the final molecular weight. The compound is characterized by an infrared spectrum having a wide intense, absorption band of 1,000 cm.$^{-1}$ to 1,400 cm.$^{-1}$ (wavelength) with two main peaks at 1,035 and 1,225 cm. at 1,885 cm.$^{-1}$ has been attributed to the presence of $-CF_2-COF_3$ groups. The liquid products have densities of about 1.8 g./cm.$^3$ and refractive indices between substantially 1.28 and 1.29 while the solid product has an absorption band at 1,040 cm.$^{-1}$.

It is an object of the present invention to provide an improved process for the production of oxygen-containing fluorocarbons which, as noted in the aforementioned application and patent, can be used as a lubricant, as a water-repellent agent or a oleophobic agent for the treatment of fibers and textiles and as surface-active agents or precursors for such agents, the process extending the principles of our earlier application and facilitating the formation of these products.

Another object of our invention is the provision of an improved process for the production of polyoxyperfluoromethylenes.

Still another object is the provision of a process for producing polyoxyperfluoromethylene whose chemical and physical properties are far superior to those obtainable by the gas-phase ozone/oxygen oxidation of tetrafluoroethylene.

We have found, surprisingly, that a substantial improvement in the reaction described in application Ser. No. (642,326, can be obtained by carrying out the oxidative interaction of tetrafluoroethylene and ozone/oxygen in an inert organic liquid medium, in spite of the fact that one would normally expect such a medium to restrict the reaction of gaseous ozone with tetrafluoroethylene. The improvement is characterized by the possibility of extending the polymer chains to lengths far exceeding those which are obtainable by the gas-phase reaction. According to a more specific feature of this invention, tetrafluoroethylene is reacted with ozone-containing molecular oxygen in a reaction medium consisting of an organic polyfluorinated or chlorofluorinated liquid with a molar ratio $C_2F_4$:$O_2$ of substantially 1 to 2.5 with a molar ratio $C_2F_4$:O between substantially 10 and 500, and at temperatures between 10° and 40° C. at pressures between 700 and 800 mm. Hg.

The expression "organic polyfluorinated or chlorofluorinated liquid" is intended to identify organic compounds (with a carbon chain or ring having from one to 12 carbon atoms and a plurality of fluorine atom (preferably three or more fluorine atoms) or at least one chlorine atom (preferably three or more) and at least one fluorine atom. The solvents or liquid media thus may be considered fluorocarbons or chlorofluorocarbons as described in greater detail below. It should be noted, however, that at the indicated reaction temperature and pressure the fluorinated or chlorofluorinated compound should be in the liquid state.

We have also found that the method of interreacting the components is an important factor in obtaining long-chain polymers of reproducible characteristics. It has been found that such reproducibility can be ensured by using a reactor provided with a stirrer and two inlet pipes along the bottom of the reactor for supplying the reaction gases, i.e. the ozone-containing oxygen stream and the tetrafluoroethylene stream. The reactor contains the polyfluorinated or chlorofluorinated organic liquid in the form of a single polyfluorinated compound or chlorofluorinated compound or as a mixture of one or more thereof. The gases are thus bubbled into the reaction medium from the bottom of the vessel, the gaseous products being collected above the collection medium and separated to recover unreacted $C_2F_4$ which may be recycled as noted earlier. The liquid products are separated from the reaction medium by distillation, the process being carried out continuously or discontinuously. In the continuous process, the gases are removed continuously from above the reaction medium while the liquid component is extracted from below, the reaction medium being maintained at a constant level by recirculating subsequently to the distillation.

It has been found that it is possible to obtain 3 4 moles of tetrafluoroethylene oxide ($C_2F_4O$) for each mole of tetrafluoroethylene (TFE) which enters a polyoxyperfluoromethylenic chain. The carbonylfluoride produced by this system is inversely proportional to the molar ratio $C_2F_4$:$O_2$ although the actual quantity obtained is determined by the reaction medium employed.

While the liquid polymeric products obtainable by the present system have essentially the same structure and characteristics as those already described and which have been fully discussed in the aforementioned copending application, it may be pointed out that the structure is principally constituted by a repetition of the structural unit $(CF_2-O)$ to the polymerization degree represented by $n$. The polymer chain may, however, also include "irregularities" in the form of direct carbon-carbon bonds or peroxidic (oxygen-oxygen) bonds which have not been the product. The terminal groups of the polymer chains are constituted partly by acidlike units having the structure

and partly by neutral $-CF_3$ groups. As a consequence, even the liquid raw product, upon recovery from the reaction medium, manifests surface-active properties.

The acid polymers of the raw mixture may be decomposed by treatment with basic substances, e.g. ethyllithium ($LiC_2H_5$). In this manner neutral viscous oil as a residue with about 60 percent of the raw starting product easily separable from the reaction mixture, for instance by distillation and/or by extraction.

We have found this oil thus obtained not to be miscible with any of the standard organic solvents and only partially miscible with the fluorinated or chlorofluorinated solvents. It is inert to acidic reactants as well as to basic reactants. Its viscosity is about 20 times higher than the viscosity of an analogous product obtained by oxidizing tetrafluoroethylene in the gaseous phase. The molecular weight is about 8,000.

In spite of the strong increase of these parameters in comparison to those of the analogous product obtained from curve of viscosity with respect to the temperature, of the product according to this invention, is practically unchanged with respect to that of the products produced by gas-phase oxidation as described in the aforementioned application. Furthermore, both the absolute viscosity value at room temperature as well as its curve with respect to the variation of the temperature remain unchanged after a prolonged heat treatment up to temperatures of 300° C.

According to this invention, the polyfluorinated or chlorofluorinated organic liquids suitable as reaction media may be selected from those which at room temperature and at atmospheric pressure are liquid and inert with respect to the reactants and to the products. Examples of such organic liquids are 1,1,2-trichloro-1,2,2-trifluoroethane, monofluorotrichloromethane, 0and perfluoromethylcyclohexane. However, 1,1,2-trichloro-1,2,2-trifluoroethane has been found to be most effective.

The reacting gases are fed into the reaction vessel at such a flow rate as to have at the moment of the contact with the reaction medium a molar ratio C2F4:O2 between 1 and 2.5, (preferably between 1.5 and 2), and a molar ratio $C_2F_4$:$O_3$ between 10 and 500 (preferably between 100 and 400).

When conducting the reaction with a molar ratio C2F4:O2 greater than 2.5, we have observed a tendency to form polytetrafluoroethylene, while if in the reaction mixture the molar ratio $C_2F_4$:O2 is smaller than 1, there will remain in the polyoxyperfluoromethylenic chain some peroxidic bonds which will reduce the heat stability of the same. The ozone contained in the molecular oxygen is produced conventionally, preferably by letting oxygen flow through an high-potential electric spark ozonizer arranged between the oxygen supply line and the reactor.

The following examples are given to illustrate this invention and indicate the best mode currently known to us for carrying it out:

EXAMPLE 1

Into a 1,000 cc. reactor containing 550 g. of 1,1,2-trichloro-1,2,2-trifluoroethane we bubbled continuously under stirring, via two concentric (coaxial) inlet pipes, 3,500 cc./hr. (S.T.P.) of $C_2F_4$ and 190 cc./hr. (S.T.P.) of $ON_2$, and 1,710 cc./hr. (S.T.P.) of oxygen, previously passed through an ozonizer. The proportion of $O_3$ in the $O_2$ supplied to the reactor was to 2.1 moles of $O_3$ per 100 moles of $O_2$ (molar ratio $C_2F_4/O_3$ =99.3; molar ratio $C_2F_4/O_2$=2.09).

The reactor was held at a temperature of 15° C. and the absolute pressure was equal to 758 mm. Hg. On top of the reaction flask was placed a water cooler for the refluxing (of the 1,1,2-trichloro-1,2,2-trifluoroethane. At the outlet of the refluxing condenser, the reaction gases were conducted to a chromatograph in which the outflowing reaction gases were analyzed. The molar percentages of the individual organic components in gaseous phase flowing out of the reactor, obtained by the gaschromatographic analysis, were: $C_2F_4$= 49.84% $C_2F_4O$=29.16% $COF_2$=21.00%.

In the course of 22 hours, 32.4 g. of liquid polymer were formed. After separating it from the solvent by distillation, this polymer under the I.R. analysis showed an absorption spectrum typical of the polyoxyperfluoromethylenic structure $(CF_2O)_n$ and had an average molecular weight of 8,000. The total conversion of the C2F4 was equal to 48.83 percent with a net yield in $C_2F_4O$ of 62 percent and in $(CF_2O)_n$ of 15.8 percent.

EXAMPLE 2

Into the reactor described in example 1, containing 550 g. of 1,1,2-trichloro-1,2,2-trifluoroethane, were bubbled, 2,700 cc./hr. (S.T.P.) of $C_2F_4$ and 1,570 cc./hr. (S.T.P.) of oxygen previously passed through an ozonizer. The proportion of $O_3$ in the $O_2$ fed into the reactor was 1.6 moles of $O_3$ per 100 moles of $O_2$ (molar ratio $C_2F_4/O_3$=107; molar ratio $C_2F_4/O_2$ =1.75).

The temperature of the reactor amounted to 15° C. and the absolute pressure was 755 mm. Hg.

The molar percentages of the individual organic components in gaseous phase were: $C_2F_4$=52.12 percent; $C_2F_4O$= 26.77 percent; $COF_2$=21.12 percent.

After 22 hours, 24.2 g. of liquid polymer with an average molecular weight of 7,500 were separated from the reaction medium by distillation.

The total conversion of the $C_2F_4$ was 45.6 percent, with a net yield in $C_2F_4O$ of 60 percent and in $(CF_2O)_n$ of 16.2 percent.

EXAMPLE 3

Into the same reactor as that described in the preceding example and containing the same reaction medium, were passed 2,000 cc./hr. (S.T.P.) of C2F4 and 2,000 cc./hr. (S.T.P.) of oxygen previously passed through an ozonizer. 0

The proportion of $O_3$ in the $O_2$ fed into the reactor amounted to 2.1 moles of $O_3$ per 100 moles of $O_2$ (molar ratio $C_2F_4$/Ox47; molar ratio $C_2F_4/O_2$=1).

The temperature of the reactor was 15° C. while the absolute pressure was 762 mm./Hg.

The molar percentages of the individual organic components in gaseous phase was determined as:

| | |
|---|---|
| $C_2F_4$ | 42.6% |

| | |
|---|---|
| $C_2F_4O$ | 28.0% |
| $COF_2$ | 29.4% |

After 23 hours of reaction, from the reaction medium were separated by distillation 21.1 g. of liquid polymer having an average molecular weight of 4,000.

The total conversion of the $C_2F_4$ was equal to 54.3 percent, with a net yield in $C_2F_4O$ of 55.5 percent and in $(CF_2O)_n$ of 15.5 percent.

EXAMPLE 4

Into a 250 cc. flask containing 150 g. of perfluoromethylcyclohexane were fed 2,440 cc./hr. (S.T.P.) of $C_2F_4$ and 1,230 cc./hr. (S.T.P.) of oxygen previously passed through an ozonizer. 0

The proportion of $O_3$ in the $O_2$ fed into the reactor was 1.4 moles of $O_3$ per 100 moles of $O_2$ (molar ratio $C_2F_4/O_3$=138; molar ratio $C_2F_4/O_2$=2).

The temperature of the reactor was 15° C. while the absolute pressure was 758 mm. Hg.

The molar percentages of the individual organic components in gaseous phase were:

| | |
|---|---|
| $C_2F_4$ | 84.49% |
| $C_2F_4O$ | 8.26% |
| $COF_2$ | 7.24% |

After 21.5 hours, 7.8 g. of liquid polymer were separated by distillation from the perfluoromethylcyclohexane, the liquid polymer having a $(CF_2O)_n$ structure with an average molecular weight of 8,000.

The total conversion of the $C_2F_4$ was 14.74 percent, with a net yield in $C_2F_4O$ of 56.6 percent and in $(CF_2O)_n$ of 18.6 percent.

EXAMPLE 5

Into the same reactor as that described in the preceding example, containing 150 g. of perfluoromethylcyclohexane, were fed in 730 cc./hr. (S.T.P.) of $C_2F_4$ and 730 cc./hr. (S.T.P.) of oxygen previously passed through an ozonizer. The percentage of $O_3$ in the $O_2$ fed into the reactor was 1.48 moles of $O_3$ per 100 moles of $O_2$ (molar ratio $C_2F_4/O_3$=68; molar ratio $C_2F_4/O_2$=1).

The temperature of the reactor was 23° C., while the absolute pressure was to 747 mm. Hg.

The molar ratio percentages of the individual organic components in gaseous phase were to:

| | |
|---|---|
| $C_2F_4$ | 36.83% |
| $C_2F_6$ | 23.98% |
| $COF_2$ | 38.84% |
| and $C_3F_6$ | 0.25% |

After 20.5 hours, 6.7 g. of liquid polymer were separated by distillation from the perfluoromethylcyclohexane, the liquid polymer having a $(CF_2O)_n$ structure with an average molecular weight of about 5,000.

The total conversion of the $C_2F_4$ was equal to 58.09 percent with a net yield in $C_2F_4O$ of 46.9 percent and in $(CF_2O)_n$ of 14.3 percent.

In table 1, infra, we show two tests pointing out the significance of using liquid phase (second test) by comparison with gas phase (first test).

TABLE 1.—OXIDATION OF $C_2F_4$ AT ROOM TEMPERATURE AND PRESSURE; REACTION INITIATOR=OZONE

| | | | Moles of $C_2F_4$ converted in to products per mole of initiator | | | Characteristics of the $(CF_2O)_n$ after treatment with ethyllithium ($LiC_2H_5$) | | | | | |
|---|---|---|---|---|---|---|---|---|---|---|---|
| Molar ratio $C_2F_4:O_2$ | Feed flow of $C_2F_4$ in m moles/hour | Reaction medium | $C_2F_4O$ | $COF_2$ | $(CF_2O)_n$ | Average m.w. | Viscosity at 20° C. cs. | ASTM viscosity index 567-53 | Viscosity coefficient temperature VTC $1 - \frac{cs.\ at\ 210°\ F.}{cs.\ at\ 100°\ F.}$ | Superf. tension at 20° C., dine/cm. | Pour point ° C. |
| 1.82 | 30.1 | Gas phase ($N_2$ as diluent). | 5.3 | 3.9 | 1.55 | 1,500 | 4.2 | 180 | 0.56 | 17±3 | -45 |
| 1.96 | 112 | $CFCl_2$—$CF_2Cl$ (liquid phase). | 34.1 | 12.5 | 8.2 | 8,300 | 82.1 | 166.5 | 0.63 | 24.8 | -70 |

We claim:

1. A process for producing polyoxyperfluoromethylene consisting essentially of repeating —$CF_2$—O— units, comprising the steps of reacting tetrafluoroethylene with an ozone-containing molecular oxygen gas stream in a liquid reaction medium selected from the group which consists of 1,1,2-trichloro-1,2,2-trifluoroethane, monofluorotrichloromethane and perfluoromethylcyclohexane at a temperature between substantially 0° and 40° C. and at an absolute pressure of the gas stream fed into the liquid medium between 700 and 800 mm. Hg., the molar ratio $C_2F_4:O_2$ ranging between 1 and 2.5 and the molar ratio $C_2F_4:O_3$ ranging between 10 and 500; and recovering from said reaction medium a polyoxyperfluoromethylene having an average molecular weight up to about 8,000.

2. The process defined in claim 1 wherein the molar ratio $C_2F_4:O_2$ is 1.5 to 2.

3. The process defined in claim 1 wherein the molar ratio $C_2F_4:O_3$ is between 100 and 400.

4. The process defined in claim 1 wherein the reaction is carried out at substantially ambient temperature and pressure.

5. The process defined in claim 1 further comprising the step of collecting an effluent gas mixture above said reaction medium and recovering from said mixture carbonylfluoride and tetrafluoroethylene, and recycling said tetrafluoroethylene to the reaction system.

6. The process defined in claim 1 further comprising the step of collecting an effluent gas mixture above said reaction medium and recovering from said mixture $C_2F_4O$ and tetrafluoroethylene, and recycling said tetrafluoroethylene to the reaction system.

* * * * *